United States Patent
Kazama et al.

(10) Patent No.: US 8,850,234 B2
(45) Date of Patent: Sep. 30, 2014

(54) POWER MANAGEMENT APPARATUS AND METHOD

(75) Inventors: Satoshi Kazama, Kawasaki (JP);
Yoshiyasu Nakashima, Kawasaki (JP);
Isamu Yamada, Kawasaki (JP);
Masatomo Yasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 587 days.

(21) Appl. No.: 12/819,371

(22) Filed: Jun. 21, 2010

(65) Prior Publication Data
US 2010/0325465 A1 Dec. 23, 2010

(30) Foreign Application Priority Data
Jun. 22, 2009 (JP) ................................. 2009-147575

(51) Int. Cl.
*G06F 1/26* (2006.01)
*G06F 1/28* (2006.01)

(52) U.S. Cl.
CPC ...................................... *G06F 1/28* (2013.01)
USPC ........................................ 713/300; 713/320

(58) Field of Classification Search
USPC ................. 713/300, 320, 340; 702/60, 61, 62
See application file for complete search history.

(56) References Cited

U.S. PATENT DOCUMENTS

| 2002/0178387 | A1* | 11/2002 | Theron | 713/300 |
| 2006/0080625 | A1* | 4/2006 | Bose et al. | 716/5 |
| 2008/0136654 | A1* | 6/2008 | Toriello et al. | 340/636.1 |
| 2009/0138219 | A1* | 5/2009 | Bletsch et al. | 702/60 |
| 2010/0250161 | A1* | 9/2010 | Wang et al. | 702/62 |

FOREIGN PATENT DOCUMENTS

JP 2008-170169 7/2008

* cited by examiner

*Primary Examiner* — Paul Yanchus, III
(74) *Attorney, Agent, or Firm* — Staas & Halsey LLP

(57) ABSTRACT

An information processing apparatus and method include measuring power consumptions of devices and outputting power consumption data, receiving operational conditions of the devices for measuring the power consumptions of the devices, setting the operational conditions of the devices according to application-setting conditions, and executing an application program to measure reference power consumptions for executing the application program. The information processing apparatus includes a power consumption data-transmitting section transmitting power consumption data, a normalized power consumption-calculating section receiving normalized reference power consumption calculated from reference power consumptions of information processing apparatuses, and calculating normalized power consumption from the normalized reference power consumption and the reference power consumptions.

8 Claims, 17 Drawing Sheets

FIG.12

| CATEGORY | REFERENCE APPLICATION PROGRAM | CORRESPONDING APPLICATION PROGRAM |
|---|---|---|
| OFFICE APPLICATION | Microsoft Office (REGISTERED TRADEMARK) | Microsoft Office (REGISTERED TRADEMARK) Open Office (REGISTERED TRADEMARK) Just Suite (REGISTERED TRADEMARK) |
| WEB BROWSER | Internet Explorer (REGISTERED TRADEMARK) | Internet Explorer (REGISTERED TRADEMARK) Firefox (REGISTERED TRADEMARK) Opera (REGISTERED TRADEMARK) Safari (REGISTERED TRADEMARK) |
| E-MAIL | Outlook (REGISTERED TRADEMARK) | Outlook (REGISTERED TRADEMARK) Outlook express (REGISTERED TRADEMARK) Thunder bird (REGISTERED TRADEMARK) Shuriken (REGISTERED TRADEMARK) |
| ... | ... | ... |
| OTHERS | SPECIAL APPLICATION PROGRAM | OTHERS |

|  | CPU | MEMORY | LCD | Audio | WIRELESS LAN | WIRED LAN |
|---|---|---|---|---|---|---|
| OFF APPLICATION | 0.5W | 0.2W | 1W | 0.1W | 0W | 0W |
| OFFICE RUNNING | 0.5W | 0.5W | 2W | 0.1W | 0W | 0W |
| WEB BROWSER RUNNING | 0.5W | 0.5W | 2W | 0.5W | 0W | 1W |
| E-MAIL SOFTWARE RUNNING | 0.5W | 0.5W | 2W | 0.1W | 0W | 1W |

POWER MANAGEMENT APPARATUS AND METHOD

CROSS-REFERENCE TO RELATED APPLICATIONS

This application is based upon and claims the benefit of priority of the prior Japanese Patent Application No. 2009-147575, filed on Jun. 22, 2009, the entire contents of which are incorporated herein by reference.

FIELD

Various embodiments described herein relate to a power management apparatus and a power management method.

BACKGROUND

In order that battery-driven information processing apparatuses, such as notebook personal computers (hereinafter referred to as PCs), etc., can be operated for a long time by a battery, it is generally desired that their power consumption be reduced.

For example, Japanese Unexamined Patent Application Publication No. 2008-170169 proposes that users of such information processing apparatuses be notified of a remaining battery power level of the apparatus by normalizing remaining powers on the basis of a full charge capacity of a predetermined reference battery.

SUMMARY

According to an embodiment of the invention, an information processing apparatus capable of communicating with a power management server includes devices operating therein, and a power consumption data-collecting section measuring power consumptions of the devices and outputting power consumption data.

A reference application program-executing section receiving from the power management server application-setting conditions designating operational conditions of the devices for measuring the power consumptions of the devices, setting the operational conditions of the devices according to the application-setting conditions, and executing an application program to measure reference power consumptions of the devices for executing the application program.

A power consumption data-transmitting section transmitting the power consumption data outputted from the power consumption data-collecting section to the power management server, the power consumption data including the reference power consumptions.

A normalized power consumption-calculating section receiving from the power management server normalized reference power consumption calculated from reference power consumptions of a plurality of information processing apparatuses connected with the power management server, and calculating normalized power consumption from the normalized reference power consumption and the reference power consumptions, and a normalized power consumption display section indicating the normalized power consumption.

The objects and advantages of the invention will be realized and attained by means of the elements and combinations particularly pointed out in the claims.

It is to be understood that both the foregoing general description and the following detailed description are exemplary and explanatory and are not restrictive of the invention, as claimed. Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 12 is a table showing reference application programs and their corresponding application programs.

FIG. 17 is a reference power consumption data table.

DESCRIPTION OF EMBODIMENTS

Figure 1:
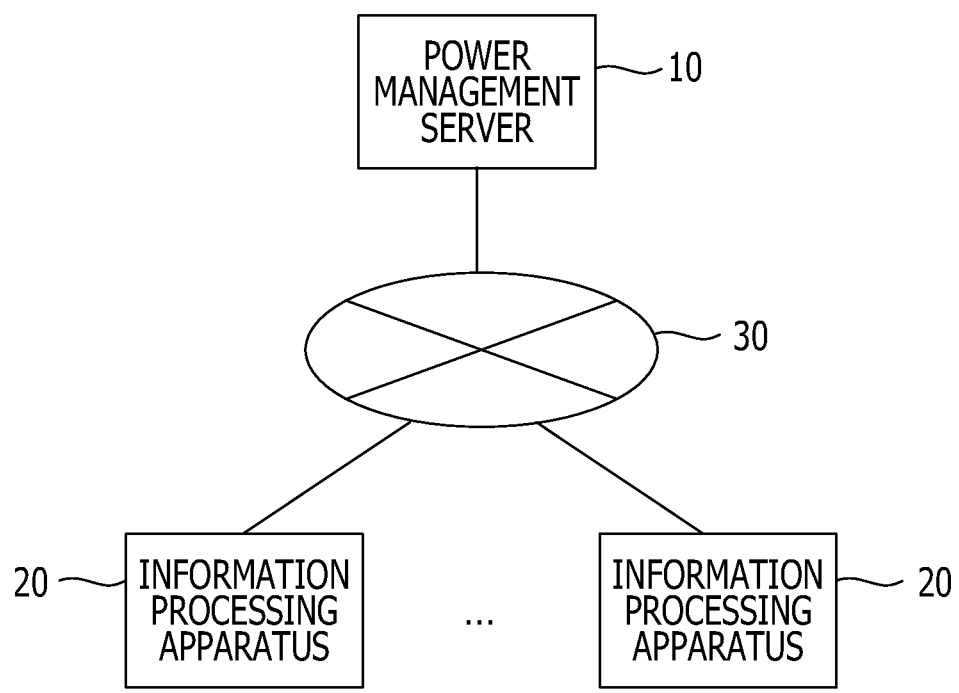
FIG. 1 is a representation of a network structure.

Reference will now be made in detail to the embodiments, examples of which are illustrated in the accompanying drawings, wherein like reference numerals refer to the like elements throughout. The embodiments are described below to explain the present invention by referring to the figures.

Generally, the standard uptimes of PCs driven by a battery are announced for each product. In practice use, however, the PC may not be able to operate for an expected uptime in some cases. This is probably because there is a difference between the general usage of PCs by users and the algorithm for calculating the standard uptime (operational time).

In addition, PC users are not informed of guidelines for increasing the uptime, and accordingly the users cannot take measures for increasing the uptime by themselves.

For example, according to the above-cited Japanese Unexamined Patent Application Publication No. 2008-170169, a normalized remaining battery power level can be known on the basis of the full charge capacity of a reference battery, but it does not take the electricity use into account. Thus, the method discussed in the Japanese Unexamined Patent Application Publication No. 2008-170169 does not allow the PC user to change the setting of the PC to achieve a target power consumption for power saving.

AC-driven PCs do not have a configuration that can detect their electricity use even if a target power consumption is set for power saving. It is therefore difficult to achieve the target power consumption. In particular, notebook PCs tend to vary their power consumption considerably due to the variation of characteristics of semiconductor devices in manufacture. It is accordingly difficult for the user to determine what conditions should be maintained to achieve the target power consumption.

In an embodiment, power management is appropriately performed without being affected by variation of characteristics of information processing apparatuses in manufacture.

FIG. 1 is a representation of the general configuration of a power management system according to an embodiment of the invention.

The power management system 1 includes a power management server 10 and at least one information processing apparatus 20 that are connected for communication through a network 30.

The power management server 10 includes a communication section (not shown) and can be connected to at least one information processing apparatus 20 through a network 30, such as the internet or a LAN.

The power management server 10 includes a CPU, a ROM, a RAM, a hard disk, a communication interface, and an input/output interface, and, for example, may be an ordinary computer system. Operations of the power management server 10 may be decentralized to be performed by a plurality of computer systems connected to each other through a network.

The information processing apparatus 20 includes a CPU, a ROM, a RAM, a hard disk, a communication interface, and an input/output interface, and, for example, may be a personal computer. The information processing apparatus 20 can communicate with the power management server 10 through the network 30.

Also, the information processing apparatus 20 can measure the power consumptions of its devices. The measurements of power consumption can be indicated on a display.

Figure 2:
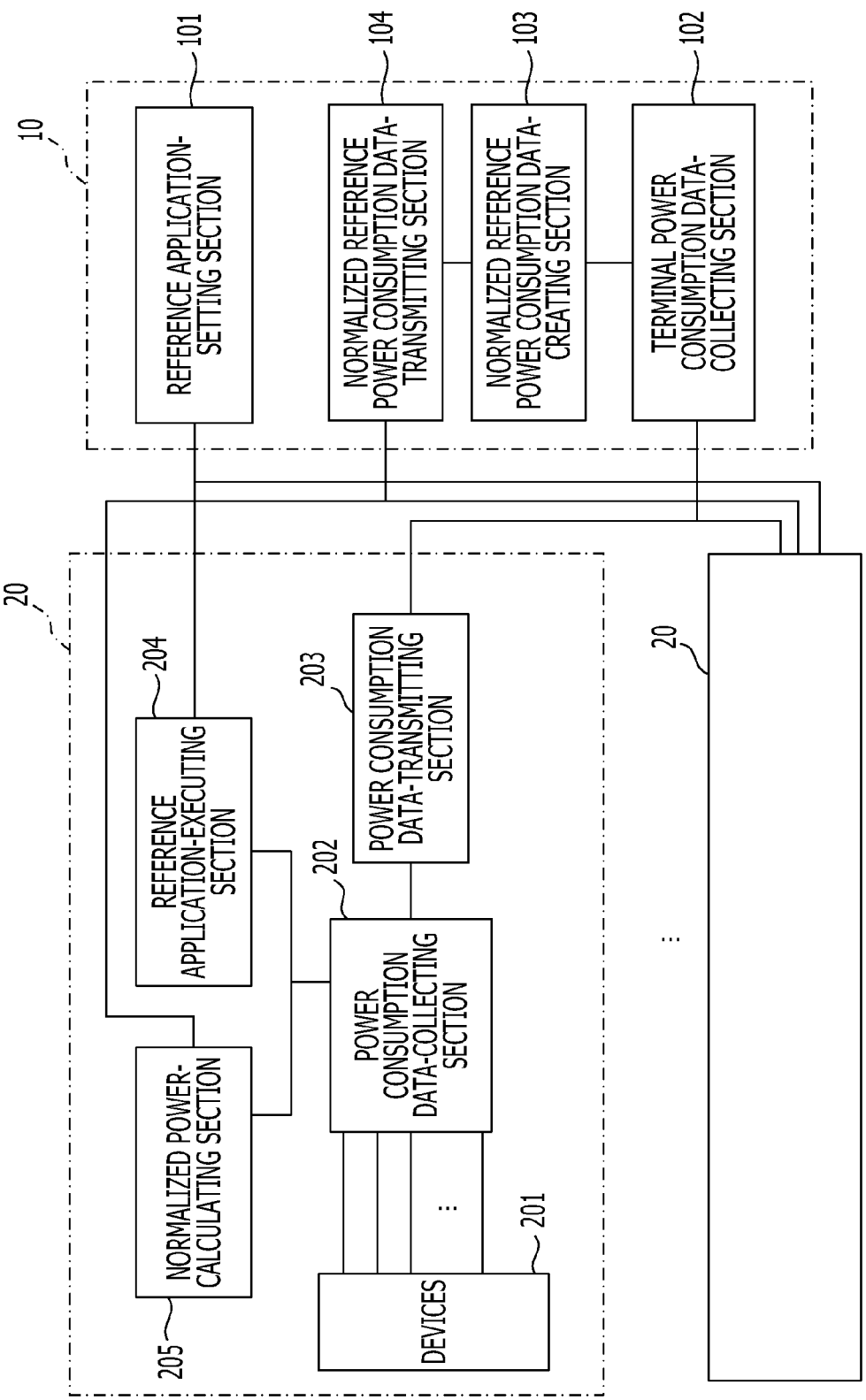
FIG. 2 is a functional block diagram of a configuration according to an embodiment of the invention.

FIG. 2 is a functional block diagram of the power management server 10 and the information processing apparatus 20.

The information processing apparatus 20 includes devices 201 consuming electricity therein, a power consumption data-collecting section 202 measuring power consumptions of the devices 201, a power consumption data-transmitting section 203 transmitting reference power consumption data to the power management server 10, a reference application program-executing section 204 executing an application program to measure reference power consumptions of the devices, and a normalized power consumption calculation/display section 205 calculating current normalized power consumptions from normalized reference power consumption data transmitted from the power management server 10 and indicating the calculated normalized power consumptions.

The devices 201 are components consuming electricity. If the information processing apparatus 20 is a notebook personal computer, the notebook personal computer typically includes a CPU, a chip set, a memory device, an audio output device, a wired LAN device, a wireless LAN device, a liquid crystal display and a backlight as devices 201.

The reference application program-executing section 204 executes an application program to measure reference power consumption. The reference application program-executing section 204 sets the devices 201 according to predetermined application-setting conditions received from the power management server 10 and executes a reference application program to obtain reference power consumptions of the devices.

The reference application program can be selected from the popular application programs installed in personal computers, such as text editing software represented by Microsoft Office (registered trademark), information browsing software represented by Internet Explorer (registered trademark), and e-mail software represented by Outlook (registered trademark).

The power management server 10 designates such an application program as the reference application program to obtain reference power consumption. Other application programs corresponding to these application programs may be used as the reference application program.

For measuring reference power consumption, the reference application program-executing section 204 sets the power conditions of the devices 201 according to application-setting conditions received from the power management server 10 and executes the reference application program.

The application-setting conditions include information such as brightness of the backlight, volume of the audio output device, on/off state of the wireless LAN device, and on/off state of the wired LAN device. While exemplary application-setting conditions are described herein, the present invention is not limited thereto. For example, any characteristic of a device (apparatus or machine) associated with performance and that can be selectively controlled can be identified as an application setting condition.

The reference application program-executing section 204 may receive the application-setting conditions at a time of measuring reference power consumption by a request for application-setting conditions from the power management server 10, or it may receive the application-setting conditions from the power management server 10 at any time before measuring the reference power consumption. The power management server 10 may transmit the application-setting conditions in response to receiving a request for transmission from the information processing apparatus 20, or it may distribute the application-setting conditions to the information processing apparatus 20 at any time such as when the application-setting conditions are changed.

If the reference application program is not installed to the information processing apparatus 20, the reference application program-executing section 204 sets the devices 201 to the same application-setting conditions and execute another application program corresponding to the reference application program.

The power consumption data-collecting section 202 measures the respective power consumptions of the devices 201, such as a CPU, a memory device, a liquid crystal display, an audio output device, a wireless LAN device, and a wired LAN device, and can output power consumption data including their power consumption measurements.

The power consumption data-collecting section 202 measures the power consumptions of the devices 201 while the reference application program-executing section 204 is executing the reference application program, and outputs the power consumption measurements to the power consumption data-transmitting section 203.

The power consumption data-transmitting section 203 transmits power consumption data including the power consumptions of the devices 201 measured by the power consumption data-collecting section 202 to the power management server 10.

The normalized power consumption calculation/display section 205 calculates current normalized power consumption from normalized reference power consumption data transmitted from the power management server 10 and indicates a current normalized power consumption on a display, such as a liquid crystal display.

The normalized reference power consumption is calculated in the power management server 10 from reference power consumption data received from a plurality of information processing apparatuses 20. For example, the normalized reference power consumption can be an average of the reference power consumptions received from the plurality of information processing apparatuses 20.

Alternatively, the normalized reference power consumption may be calculated in an information processing apparatus 20. For example, the power management server 10 distributes reference power consumption data received from an information processing apparatus 20 to another information processing apparatus 20. The information processing apparatus 20 that has received reference power consumption data from the power management server 10 calculates normalized reference power consumption from the received reference power consumption data. The information processing apparatuses 20 thus can obtain normalized reference power consumption data.

The normalized power consumption calculation/display section 205 calculates normalized power consumption from the normalized reference power consumption, the reference power consumption for executing a reference application program, and the current power consumption, and indicates the calculated normalized power consumption on a display, such as a liquid crystal display.

The power management server 10 includes a reference application-setting section 101, a terminal power consumption data-collecting section 102, a normalized reference power consumption data-creating section 103, and a normalized reference power consumption data-transmitting section 104.

The reference application-setting section 101 transmits application-setting conditions designating conditions of the devices 201 of information processing apparatuses 20 for executing a reference application program to obtain reference power consumption.

The application-setting conditions designate parameters of the devices 201 at a time of executing the reference application program, and, as mentioned above, may include information directed to the brightness of the backlight, the volume of the audio output device, the on/off state of the wireless LAN device, and the on/off state of the wired LAN device.

The terminal power consumption data-collecting section 102 receives reference power consumption data of the devices 201 from the information processing apparatus 20. The reference power consumptions are power consumptions of the devices 201 for executing the reference application program with the devices 201 set according to the application-setting conditions.

Reference power consumptions measured by the power consumption data-collecting section 202 of the information processing apparatus 20 are electric power consumed by the respective devices 201 including a CPU, a memory device, a liquid crystal display, an audio output device, a wireless LAN device, and a wired LAN device.

The terminal power consumption data-collecting section 102 receives reference power consumption data from each information processing apparatus 20 and stores the data in a predetermined memory area.

The normalized reference power consumption data-creating section 103 calculates normalized reference power consumption from reference power consumption data of information processing apparatuses 20 received by the terminal power consumption data-collecting section 102.

For example, the normalized reference power consumption data-creating section 103 calculates the average of reference power consumptions of the information processing apparatuses 20.

The normalized reference power consumption of each device may be an average of reference power consumptions calculated for each reference application program, or calculated for a plurality of reference application programs.

The normalized reference power consumption data-transmitting section 104 transmits the normalized reference power consumption calculated in the normalized reference power consumption data-creating section 103 to the information processing apparatuses 20.

The normalized reference power consumption is calculated for each reference application program and for each device, and stored in a predetermined memory area of the power management server 10 and transmitted to the information processing apparatuses 20.

Figure 3:
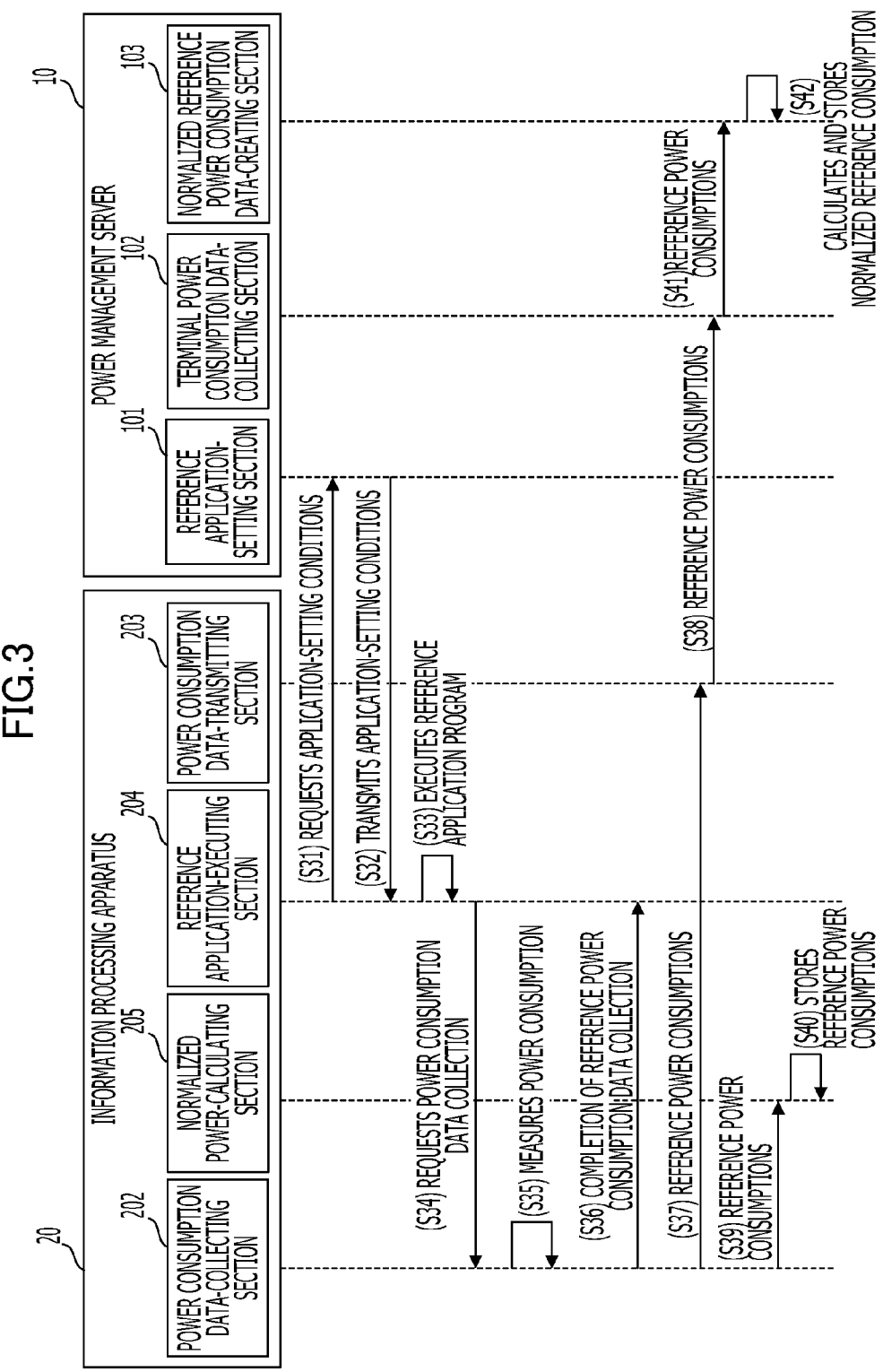
FIG. 3 is a flow chart of a process for collecting reference power consumption data.

FIG. 3 is a flow chart of an operation of the power management server 10 to collect reference power consumption data from an information processing apparatus 20.

The reference application program-executing section 204 of the information processing apparatus 20 requests application-setting conditions for a reference application program to be executed to measure reference power consumption, from the power management server 10 (operation S31).

When the reference application-setting section 101 of the power management server 10 has received the request for application-setting conditions from the information processing apparatus 20, the reference application-setting section 101 transmits application-setting conditions applicable to the reference application program to the information processing apparatus 20 (operation S32).

Application-setting conditions are stored in an application-setting condition table in a predetermined memory area of the power management server 10. Some conditions applicable to the reference application program to be executed in the information processing apparatus 20 are selected from the stored application-setting conditions.

Figure 4:
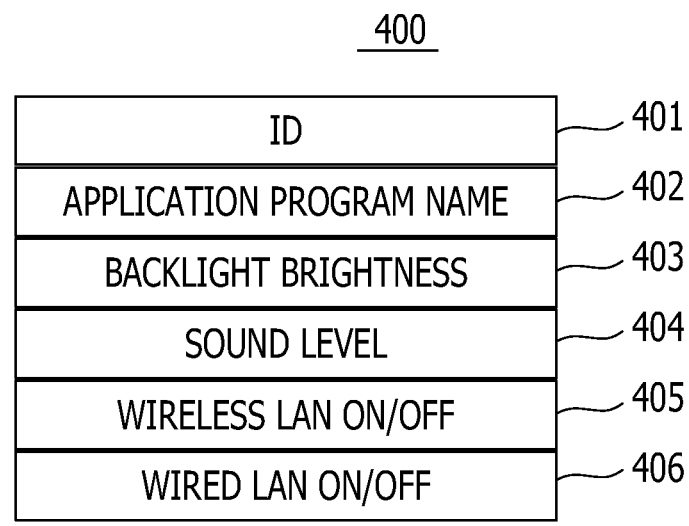
FIG. 4 is a representation of a table of application-setting conditions.

FIG. 4 shows an example of an application-setting condition table.

The application-setting condition table 400 includes an ID field 401 showing an identification number of setting conditions, an application program name field 402 showing a name of the application program executed as an reference application program, a back light brightness field 403 specifying brightness of the backlight, a sound level field 404 specifying the sound level of the audio output device, a wireless LAN on/off field 405 specifying the on/off state of the wireless LAN device, and a wired LAN on/off field 406 specifying the on/off state of the wired LAN device.

Application-setting conditions of the devices for executing reference application programs are stored in such application-setting condition tables 400 for each identification number.

The reference application-setting section 101 of the power management server 10 selects a set of application-setting conditions according to the reference application program to be executed in response to a request from the information processing apparatus 20, and transmits the selected application-setting conditions to the information processing apparatus 20.

The reference application program-executing section 204 of the information processing apparatus 20 sets the devices

201 to the received application-setting conditions, and executes the reference application program (operation S33).

The reference application program-executing section 204 transmits a request for reference power consumption data collection to the power consumption data-collecting section 202, so that the power consumption data-collecting section 202 measures power consumptions of the devices 201 during executing the reference application program (operation S34).

The power consumption data-collecting section 202 measures the power consumptions of the devices 201 during executing the reference application program in response to the request from the reference application program-executing section 204 (operation S35).

Figure 5:
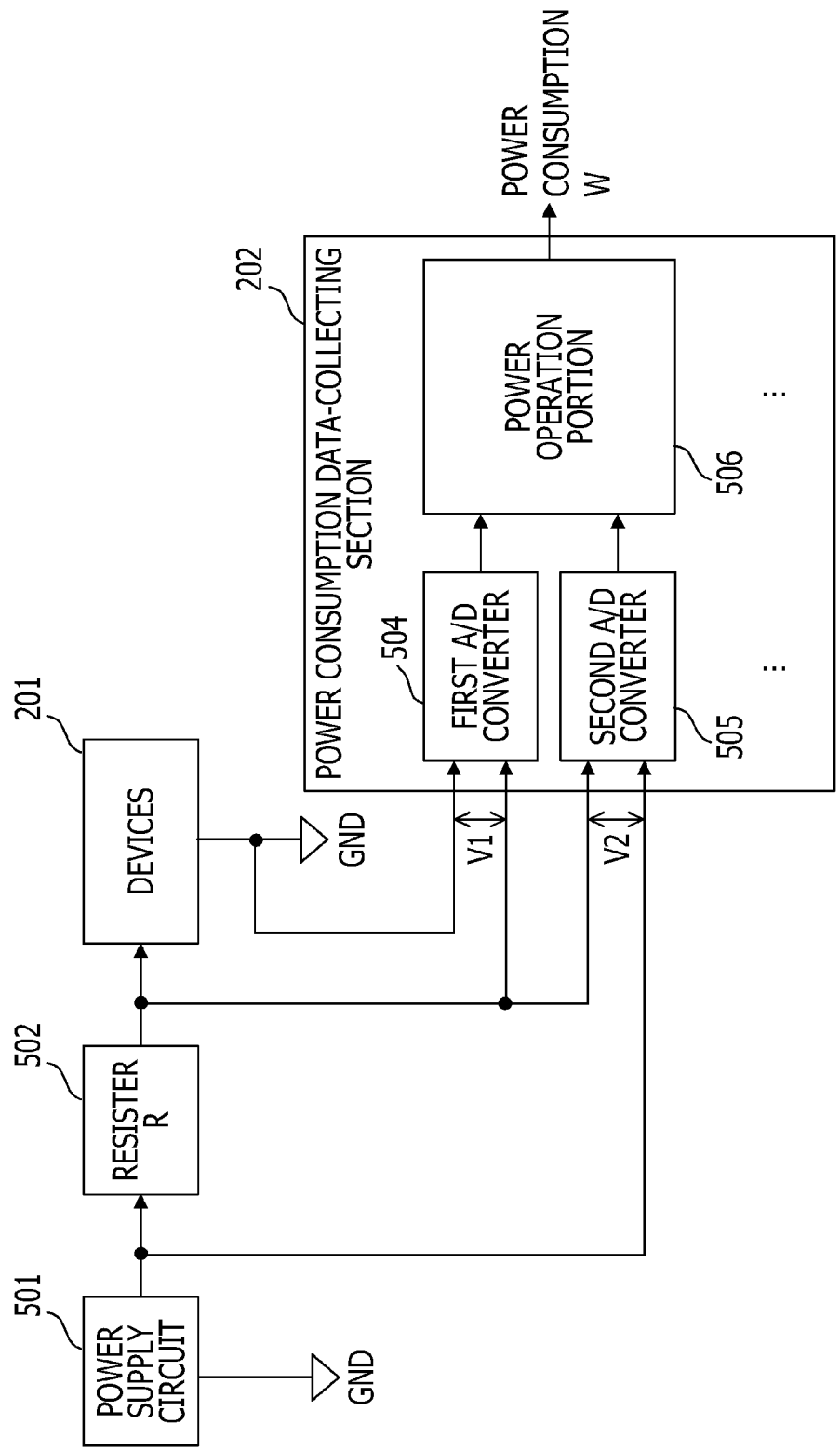
FIG. 5 is a circuit diagram of a power consumption data-collecting section.

FIG. 5 shows an example of a circuit diagram of the power consumption data-collecting section 202.

A resistor 502 having a predetermined resistance is connected between a power supply circuit 501 supplying power to the devices of the information processing apparatus 20 and the devices 201 including a CPU, a liquid crystal display and others.

The potentials at both sides of the resistor 502 and at both sides of each device 201 are input to the power consumption data-collecting section 202.

The power consumption data-collecting section 202 includes a first A/D converter 504 to which the potentials at both sides of each device 201 are input, a second A/D converter 505 to which the potentials at both sides of the resistor 502 are input, and a power operation portion 506.

The potentials at both sides of each device 201 are input to the first A/D converter 504. Their potential difference V1 is converted to a digital value and input to the power operation portion 506.

The potentials at both sides of the resistor 502 are input to the second A/D converter 505. Their potential difference V2 is converted to a digital value.

The power operation portion 506 calculates the power consumption of each device 201 from the data input from the first A/D converter 504 and the second A/D converter 505.

Each power consumption of the devices 201 is obtained by the operation of the equation: Power consumption $W = V1 \times V2 \div R$, using data V1 transmitted from the first A/D converter 504, data V2 transmitted from the second A/D converter 505, and the resistance R of the resistor 502.

The power consumption data-collecting section 202 has a configuration that can measure the power consumption of each device 201 from the potential difference between the terminals of the device 201 and the potential difference between the terminals of the resistor 502 corresponding to the device 201.

On the completion of measuring the power consumptions of the devices 201, the power consumption data-collecting section 202 notifies the reference application program-executing section 204 of the completion of reference power consumption data collection (operation S36).

The power consumption data-collecting section 202 also transmits the measured reference power consumptions to the power consumption data-transmitting section 203 (operation S37).

The power consumption data-transmitting section 203 transmits the reference power consumptions of the devices 201 measured by the power consumption data-collecting section 202 to the power management server 10 through the network 30 (operation 38).

The power consumption data-collecting section 202 transmits the measured reference power consumptions to the normalized power consumption calculation/display section 205 (operation S39), and stores the information in a predetermined memory area (operation S40).

Figure 6:
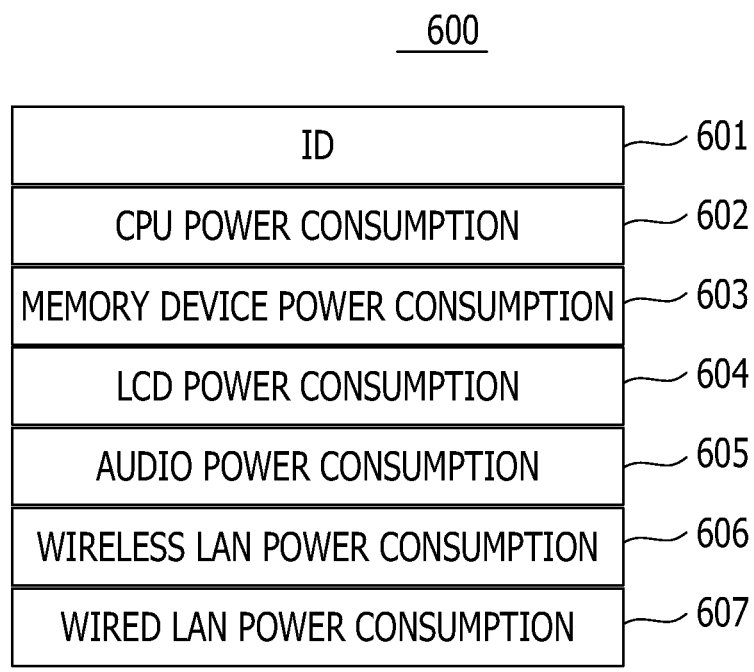
FIG. 6 is a representation of a reference power consumption data table.

FIG. 6 shows a reference power consumption data table.

The reference power consumption data table 600 includes an ID field 601 in which an information ID is stored, and reference power consumption data fields 602, 603, 604, 605, 606 and 607 (602 to 607) in which reference power consumptions of the respective devices are stored.

The information processing apparatus 20 having the reference power consumption data table 600 shown in FIG. 6 includes a CPU, a memory device, a liquid crystal display, an audio output device, a wireless LAN device and a wired LAN device as the devices 201.

The reference power consumption data fields 602 to 607 shown in FIG. 6 includes a CPU power consumption field 602, a memory device power consumption field 603, an LCD power consumption field 604, an audio power consumption filed 605, a wireless LAN power consumption field 606, and a wired LAN power consumption field 607.

The information ID stored in the ID field 601 may be an identification number given for each reference application program.

In the power management server 10, the terminal power consumption data-collecting section 102 receives reference power consumption data transmitted from the information processing apparatus 20 and transmits the data to the normalized reference power consumption data-creating section 103 (operation S41 in FIG. 3).

The terminal power consumption data-collecting section 102 may store the reference power consumption data received from the information processing apparatus 20 in a predetermined memory area of the power management server 10.

In this instance, the reference power consumption data may be managed in the reference power consumption data table 600 as shown in FIG. 6, using an information ID given for each information processing apparatus and for each reference application program.

The normalized reference power consumption data-creating section 103 calculates normalized reference power consumption from the reference power consumptions received from the information processing apparatus 20, and stores the calculated normalized reference power consumption in a predetermined memory area (operation S42).

The normalized reference power consumption data-creating section 103 may designate the average of the reference power consumptions transmitted from the information processing apparatuses 20 as the normalized reference power consumption.

Reference power consumptions of the devices of an information processing apparatus 20 may be collected using a plurality of reference application programs.

Figure 7:
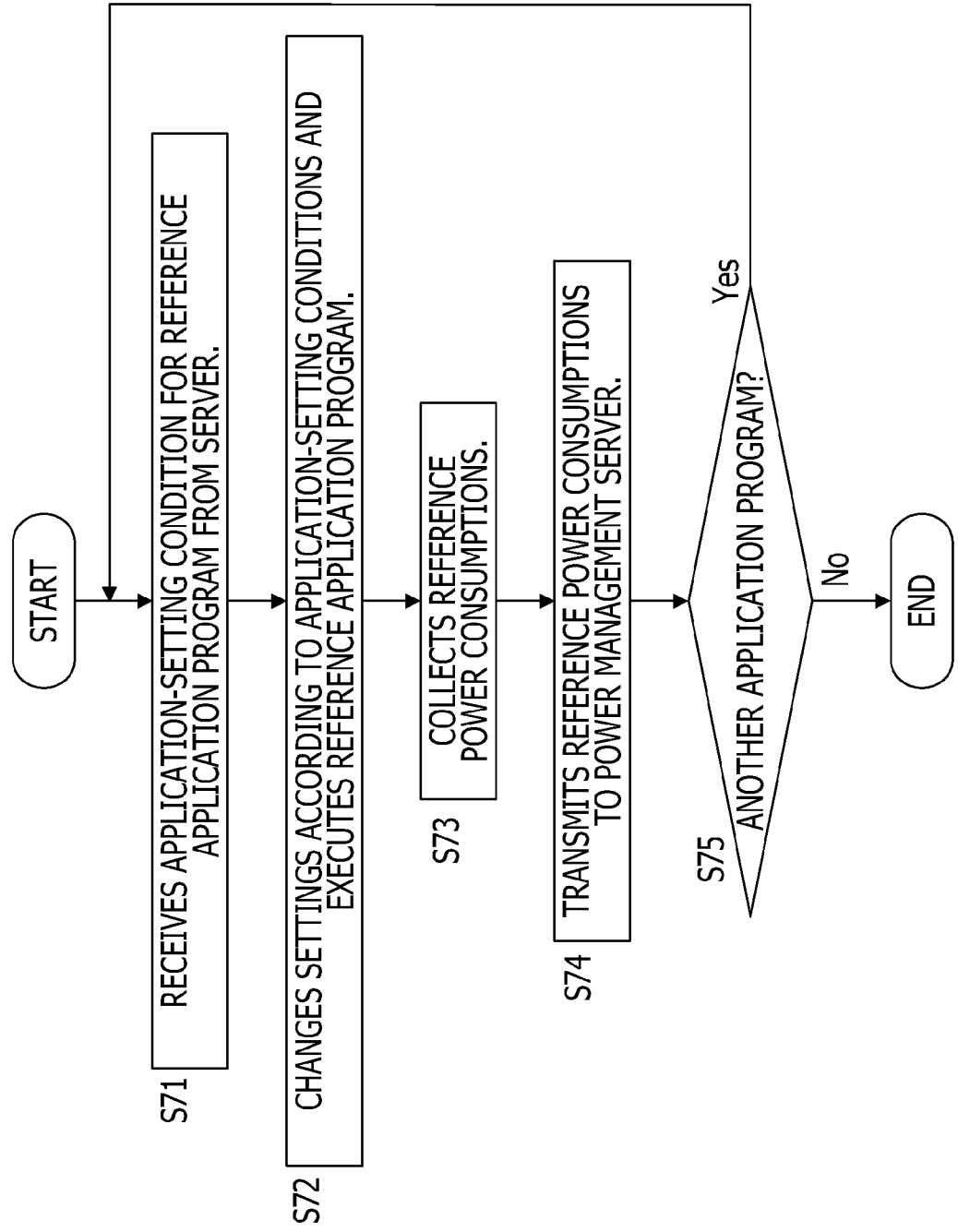
FIG. 7 is a flow chart of a process for collecting reference power consumption data for a plurality of application programs.

FIG. 7 is a flow chart of a process for collecting reference power consumption data of an information processing apparatus 20 using a plurality of application programs.

In Operation S71, the information processing apparatus 20, for example, receives application-setting conditions given for executing a reference application program from the power management server 10.

In this operation, the reference application program-executing section 204 requests application-setting conditions for a reference application program from the reference application-setting section 101 of the power management server 10.

The reference application-setting section 101 selects application-setting conditions applicable to the reference application program and transmits the selected application-setting conditions to the information processing apparatus 20.

The application-setting conditions transmitted from the reference application-setting section 101 may be the device conditions shown in the application-setting condition table 400 in FIG. 4.

Turning to operation S72, the settings of the devices 201 are changed according to the application-setting conditions received by the reference application program-executing section 204 of the information processing apparatus 20, and the corresponding reference application program is executed.

Turning to operation S73, the information processing apparatus 20 measures the power consumptions of the devices 201, and collects reference power consumptions of the devices 201 during executing the reference application program.

In Operation S73, the reference application program-executing section 204 transmits a request for reference power consumption data collection to the power consumption data-collecting section 202, so that the power consumption data-collecting section 202 measures the reference power consumptions of the devices 201, as described above.

Turning to operation S74, the information processing apparatus 20 transmits reference power consumption data to the power management server 10.

The reference power consumption data collected by the power consumption data-collecting section 202 is transmitted to the power management server 10 through the power consumption data-transmitting section 203, and then stored in a predetermined memory area and transmitted to the normalized reference power consumption data-creating section 103.

Turning to operation S75, the information processing apparatus 20 determines whether there is another reference application program. If yes, the process goes to operation S71. Otherwise, the process is terminated. According to an embodiment, a condition used in determining power consumption is selectively adjusted based on at least one application-setting condition.

For executing an application, the information processing apparatus 20 refers to normalized power consumption data calculated from normalized reference power consumption data received from the power management server 10.

Figure 8:
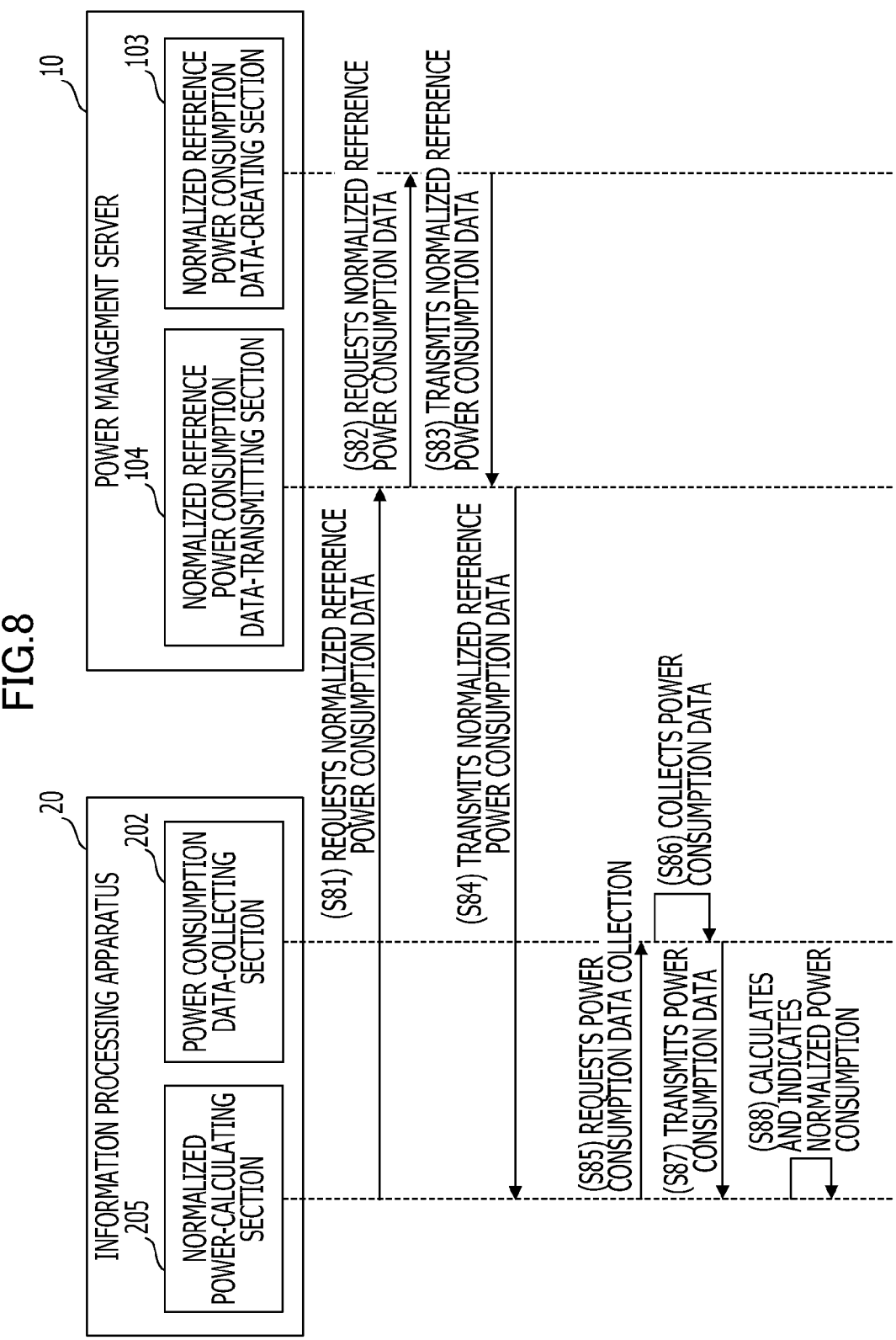
FIG. 8 is a flow chart of a process for indicating normalized power consumption.

FIG. 8 is a flow chart of a process for indicating normalized power consumption of an information processing apparatus 20.

In the process shown in FIG. 8, first, the normalized power consumption calculation/display section 205 requests normalized reference power consumption data from the power management server 10 (operation S81).

On receiving the request for normalized reference power consumption data from the information processing apparatus 20, the normalized reference power consumption data-transmitting section 104 of the power management server 10 transmits the received request to the normalized reference power consumption data-creating section 103 (operation S82).

The normalized reference power consumption data-creating section 103 transmits normalized reference power consumption data calculated from the reference power consumption data collected from a plurality of information processing apparatuses 20 to the normalized reference power consumption data-transmitting section 104 (operation S83).

In an embodiment, the normalized reference power consumption data-creating section 103 calculates the average of reference power consumptions collected from a plurality of information processing apparatuses 20 and holds the average as normalized reference power consumption data. The normalized reference power consumption data is transmitted to the normalized reference power consumption data-transmitting section 104.

The normalized reference power consumption data-transmitting section 104 transmits the normalized reference power consumption data received from the normalized reference power consumption data-creating section 103 to the information processing apparatus 20 (operation S84).

The normalized power consumption calculation/display section 205 of the information processing apparatus 20 stores the normalized reference power consumption data received from the power management server 10 in a predetermined area.

The normalized power consumption calculation/display section 205 transmits a request to collect power consumption data of the devices 201 during executing an application program to the power consumption data-collecting section 202 (operation S85).

The power consumption data-collecting section 202 measures current power consumptions of the devices 201, and collects the measured power consumptions as power consumption data (operation S86).

The power consumption data-collecting section 202 transmits the collected current power consumption data of the devices 201 to the normalized power consumption calculation/display section 205 (operation S87).

The normalized power consumption calculation/display section 205 calculates current normalized power consumption from the reference power consumption data collected during executing the reference application program, the normalized reference power consumption data received from the power management server 10, and the current power consumption data (operation S88).

The normalized power consumption calculated by the normalized power consumption calculation/display section 205 can be obtained from the equation: normalized power consumption=current power consumption×(normalized reference power consumption/reference power consumption).

The normalized power consumption calculation/display section 205 indicates calculated normalized power consumption data in a predetermined display region of the liquid crystal display.

The power management server 10 may apply a predetermined power policy to information processing apparatuses 20, and the information processing apparatuses 20 may be set to power saving conditions according to the power policy.

Figure 9:
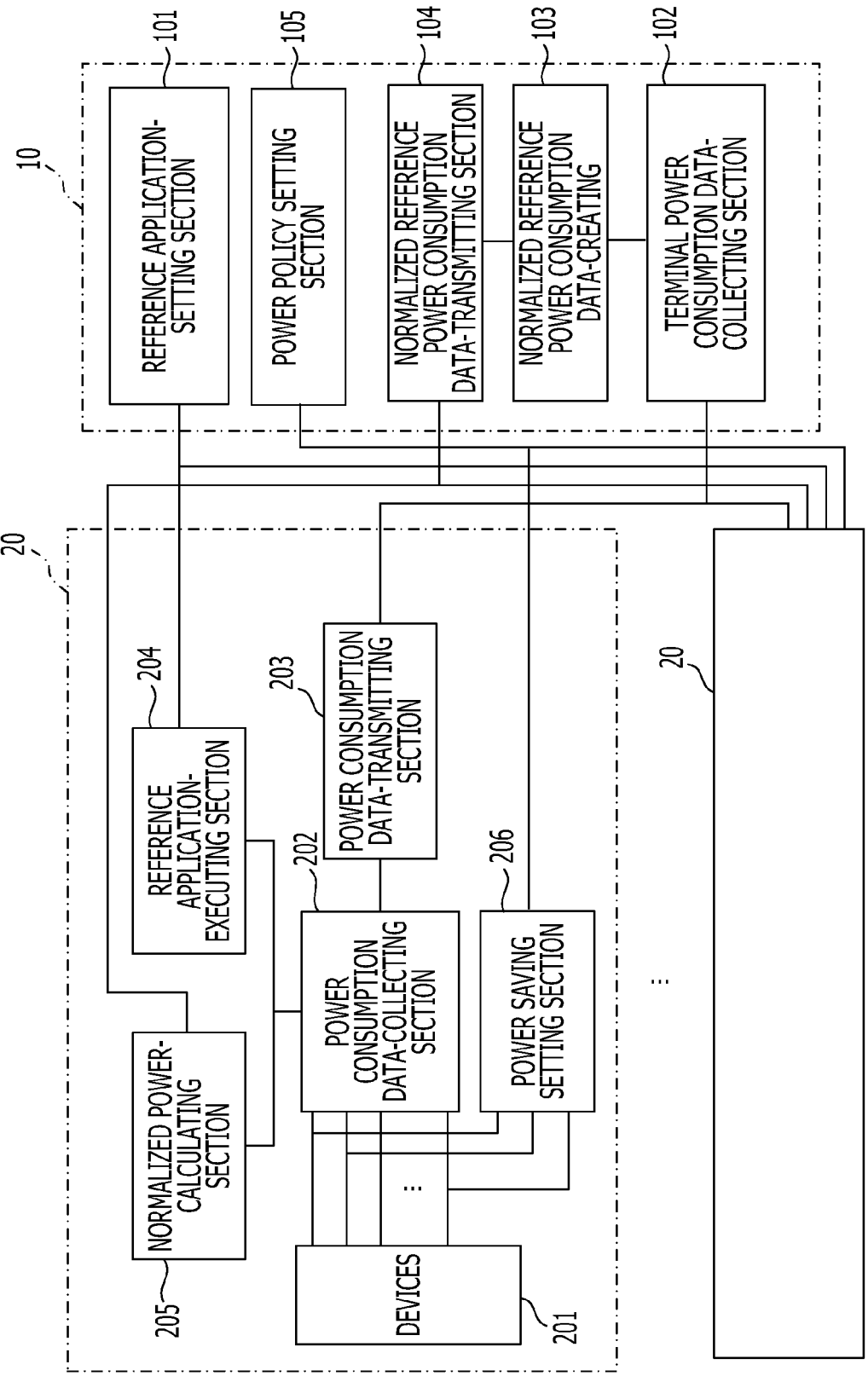
FIG. 9 is a block diagram of a configuration for applying power saving conditions.

FIG. 9 is a functional block diagram of a configuration for setting the information processing apparatus 20 to power saving conditions according to a power policy given by the power management server 10.

The configuration is described in detail using the same reference numerals as those used in the functional block diagram shown in FIG. 2.

The power management server 10 shown in FIG. 9 includes a reference application-setting section 101, a terminal power consumption data-collecting section 102, a normalized reference power consumption data-creating section 103, a normalized reference power consumption data-transmitting section 104 and a power policy-setting section 105.

The power policy-setting section 105 determines a power setting requirement for a plurality of information processing apparatuses 20 according to one or a combination of some of the information data of the information processing apparatuses 20, such as the state, season, and time zone of the information processing apparatuses 20 in operation, and transmits the determined power setting requirement to the information processing apparatuses 20.

The information processing apparatus 20 includes a power saving setting section 206. The power saving setting section 206 receives the power setting requirement transmitted from the power policy setting section 105 of the power management server 10 and stores the received power setting requirement in a predetermined memory area. The power policy setting section 105 may store predetermined data that defines power related conditions from various sources including but not limited to a user, manufacturer of a device, automatically set based on current operation, etc.

The power saving setting section 206 changes the settings of the devices 201 so that the current normalized power consumptions calculated by the normalized power consumption calculation/display section 205 satisfy the received power setting requirement.

Figure 10:
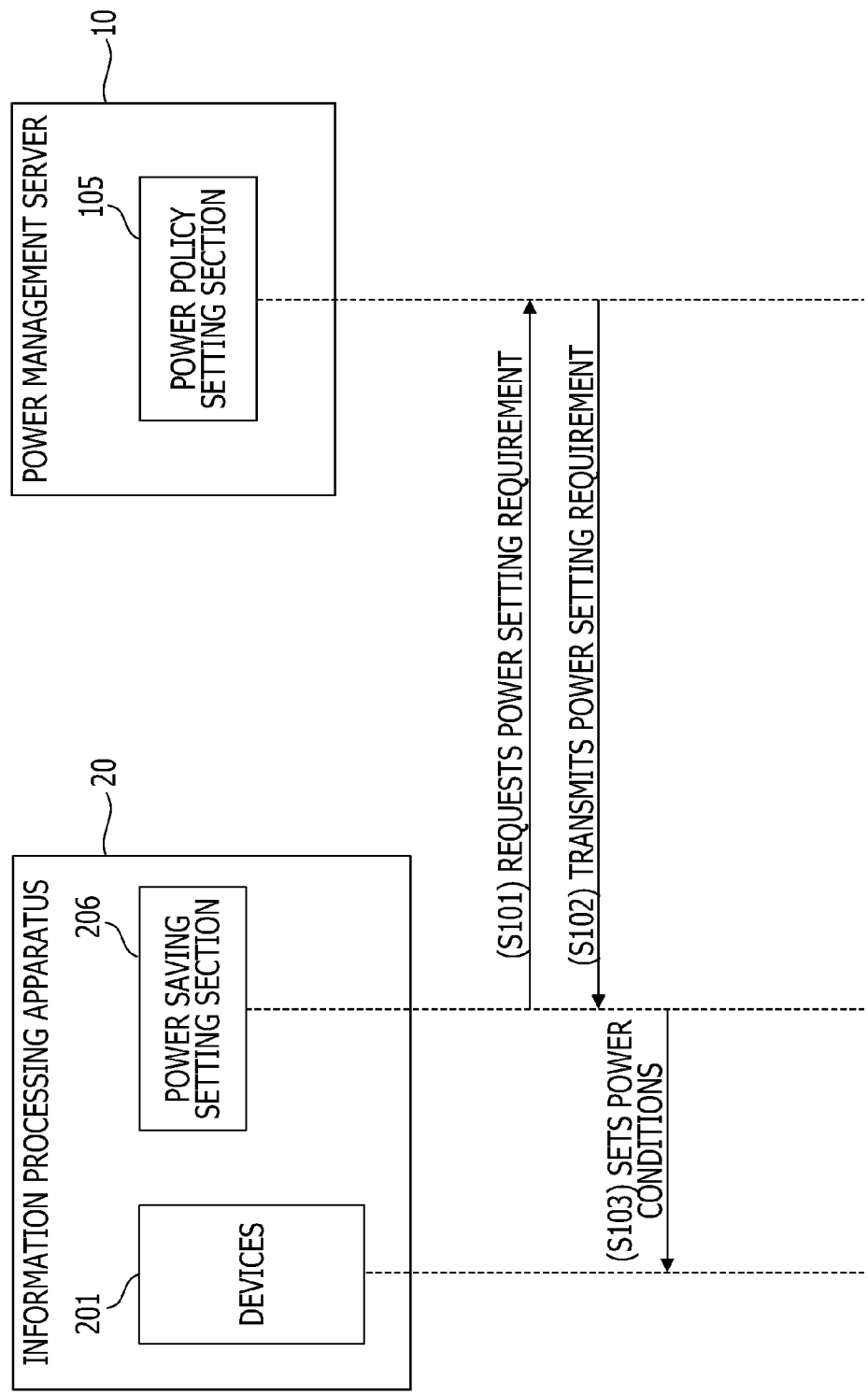
FIG. 10 is a flow chart of a process for saving power.

FIG. 10 is a flow chart of a process for setting an information processing apparatus 20 to power saving conditions according to the power setting requirement given by the power management server 10.

In the configuration shown in FIG. 10, the power saving setting section 206 of an information processing apparatus 20 transmits a request for a power setting requirement to the power management server 10 (operation S101).

When the power policy setting section 105 of the power management server 10 has received a request for power setting requirement from an information processing apparatus 20, the power policy setting section 105 determines what requirement should be given to the information processing apparatus 20, and transmits the determined requirement (operation S102).

The power policy setting section 105 manages a power policy table given according to current operational states of information processing apparatuses 20 connected to the network and the season and time zone in operation of the information processing apparatuses 20, and determines a power setting requirement to be transmitted to the information processing apparatuses 20 according to the power policy table.

The power saving setting section 206 of the information processing apparatus 20 stores the power setting requirement received from the power management server 10 in a predetermined memory area and sets the power conditions of the devices 201 of the information processing apparatus 20 so as to satisfy the power setting requirement (operation S103).

The power setting requirement may be a range of normalized power consumption or on/off conditions of the devices 201, or both.

If the power setting requirement specifies a range of normalized power consumption of the devices 201, the power saving setting section 206 changes the settings of the devices 201 so that the normalized power consumptions of the devices 201 calculated by the normalized power consumption calculation/display section 205 can be in the range of normalized power consumption given as the power setting requirement.

Figure 11:
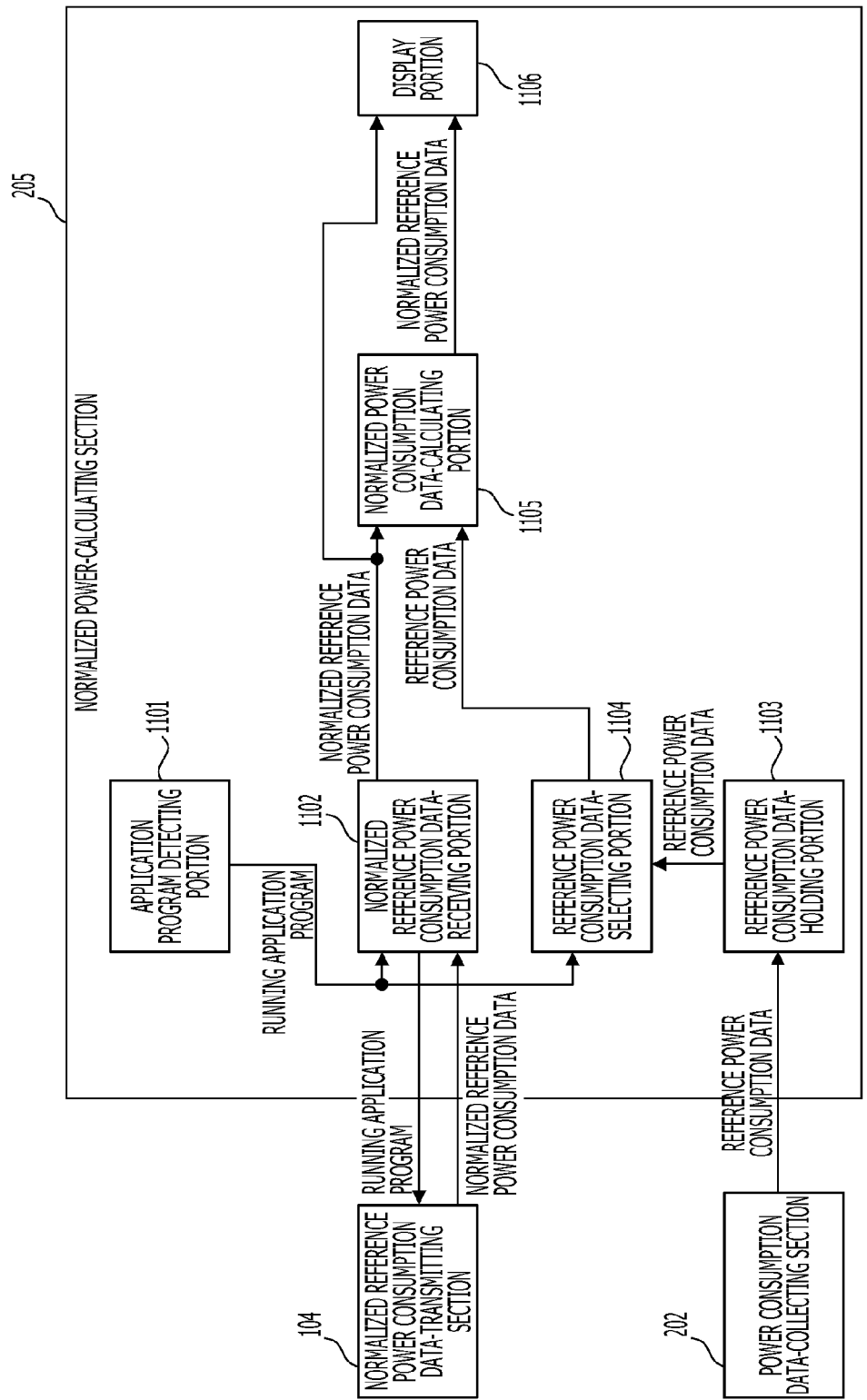
FIG. 11 is a functional block diagram of a normalized power consumption calculation/display section.

FIG. 11 is a detailed functional block diagram of the normalized power consumption calculation/display section 205.

The normalized power consumption calculation/display section 205 of the information processing apparatus 20 includes an application program detecting portion 1101, a normalized reference power consumption data-receiving portion 1102, a reference power consumption data-holding portion 1103, a reference power consumption data-selecting portion 1104, a normalized power consumption-calculating portion 1105, and a display portion 1106.

The application program-detecting portion 1101 detects which application program is being used when the program has been executed in the information processing apparatus 20.

The normalized reference power consumption data-receiving portion 1102 requests normalized reference power consumption data from the power management server 10 according to the application program detected by the application program-detecting portion 1101, and receives normalized reference power consumption data transmitted from the normalized reference power consumption data-transmitting section 104 of the power management server 10.

The reference power consumption data-holding portion 1103 stores reference power consumption data collected by the power consumption data-collecting section 202 during executing the reference application program.

The reference power consumption data-holding portion 1103 may store a reference power consumption data table 1700 as shown in FIG. 17.

The reference power consumption data table 1700 shown in FIG. 17 includes information showing whether or not the reference application program runs, such as "off application" (in a state where application programs do not run), "Office running", "web browser running", and "e-mail software running", and information showing the devices 201, such as "CPU", "memory", "LCD", "Audio", "wireless LAN", and "wired LAN", in a matrix.

The reference power consumption data table 1700 shown in FIG. 17 stores reference power consumption data obtained by measuring power consumptions of the devices 201 by the power consumption data-collecting section 202 when reference application programs are executed under conditions specified by information showing whether or not the reference application programs run. The reference power consumptions are stored in the corresponding cells.

The reference power consumption data-selecting portion 1104 selects reference power consumption data from the information stored in the reference power consumption data-holding portion 1103 according to the application program detected by the application program-detecting portion 1101.

The normalized power consumption-calculating portion 1105 calculates normalized power consumptions from the normalized reference power consumption data received by the normalized reference power consumption data-receiving portion 1102, the reference power consumption data selected by the reference power consumption data-selecting portion 1104, and the current power consumption data.

The display portion 1106 outputs the normalized power consumption data calculated in the normalized power consumption-calculating portion 1105 and the normalized reference power consumption data received by the normalized reference power consumption data-receiving portion 1102.

FIG. 12 is an application correspondence table showing reference application programs and their corresponding application programs.

Reference application programs executed to measure reference power consumptions include, for example, text editing software such as Microsoft Office (registered trademark), information browsing software such as Internet Explorer (registered trademark), and e-mail software such as Outlook (registered trademark).

However, users may install other application programs in their information processing apparatuses 20 according to their preferences.

In an application correspondence table, for example, Microsoft Office is designated as the reference application program of office application software, and Open Office (registered trademark) and Just Suite (registered trademark) may be designated as application programs corresponding to the reference application program. A reference application program and its corresponding application programs are set for each category.

If power consumption is measured using a special application program not applicable to those given categories, the special application program can be designated as other category in the table.

The reference power consumption data-selecting portion 1104 determines the category of the application program detected by the application program-detecting portion 1101 and determines whether or not the detected application program is included in the application programs corresponding to the reference application program of the category.

The reference power consumption data-selecting portion 1104 (FIG. 11) selects reference power consumption data from the information stored in the reference power consumption data-holding portion 1103 according to the reference application program corresponding to the application program used, and transmits the selected data to the normalized power consumption-calculating portion 1105.

The normalized reference power consumption data-receiving portion 1102 requests normalized reference power consumption data for the reference application program from the power management server 10 according to the application program detected by the application program-detecting portion 1101, and receives normalized reference power consumption data transmitted from the normalized reference power consumption data-transmitting section 104 of the power management server 10.

The normalized reference power consumption data-receiving portion 1102 transmits the received normalized reference power consumption data to the normalized power consumption-calculating portion 1105.

The normalized power consumption-calculating portion 1105 calculates normalized power consumptions from the normalized reference power consumption data received by the normalized reference power consumption data-receiving portion 1102, the reference power consumption data selected by the reference power consumption data-selecting portion 1104, and the current power consumption data.

The normalized power consumption-calculating portion 1105 calculates a normalized power consumption from the equation: normalized power consumption=current power consumption×(normalized reference power consumption/reference power consumption).

The display portion 1106 outputs normalized power consumption calculated in the normalized power consumption-calculating portion 1105 and normalized reference power consumption data received by the normalized reference power consumption data-receiving portion 1102 to indicate the output data in a predetermined display region, such as a liquid crystal display.

Figure 13:
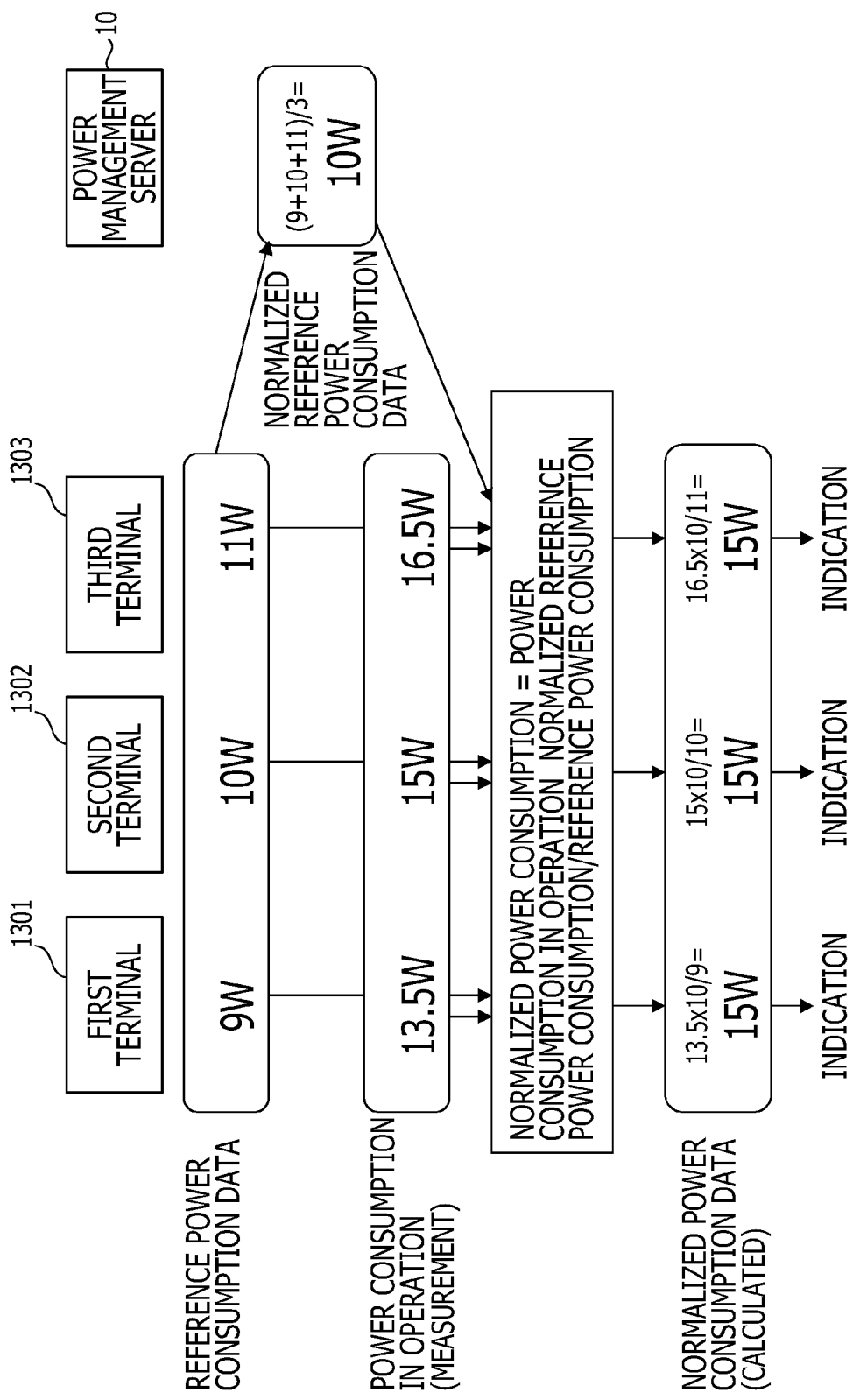
FIG. 13 is a representation of a process for calculating normalized power consumption.

FIG. 13 is a representation of a process for calculating normalized power consumption.

Assume that first to third terminals 1301, 1302 and 1303 (1301 to 1303) are connected to the power management server 10 for communication, as shown in FIG. 13.

Let us suppose that reference power consumptions PB1 to PB3 of the first to third terminals 1301 to 1303 are 9 W, 10 W and 11 W respectively for executing a reference application program.

The terminal power consumption data-collecting section 102 of the power management server 10 collects these reference power consumptions PB1 to PB3 and calculates normalized reference power consumption PN.

At this time, the normalized reference power consumption data-creating section 103 of the power management server 10 averages the reference power consumptions PB1 to PB3 to yield a normalized reference power consumption PN (normalized reference power consumption PN=(PB1+PB2+PB3)/3).

In FIG. 13, a normalized reference power consumption PN of 10 W is obtained by calculation in the normalized reference power consumption data-creating section 103.

The normalized power consumption calculation/display section 205 calculates normalized power consumptions PN1 to PN3 from the equation: power consumption in operation× (normalized reference power consumption/reference power consumption). When the power consumptions P1 to P3 in operation of the first to third terminals 1301 to 1303 are 13.5 W, 15 W and 16.5 W, respectively, normalized power consumptions PN1 to PN3 of 15 W, 15 W and 15 W are obtained by calculation. The normalized power consumptions is calculated across the terminals 1301 to 1303.

Although three information processing apparatuses, or the first to third terminals, are connected to a network in an embodiment, the number of information processing apparatuses is not limited to three. When the number of information processing apparatuses is n, the reference power consumptions PB1 to PBn of the information processing apparatuses can be calculated from the equation: normalized reference power consumption PN=(PB1+PB2+ . . . PBn)/n.

Figure 14:
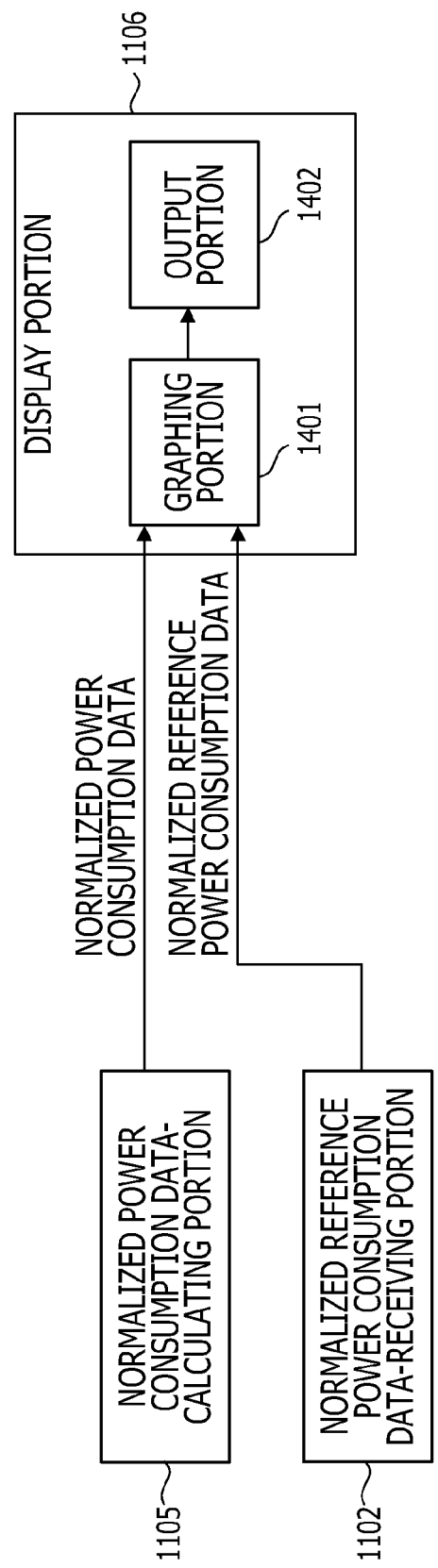
FIG. 14 is a functional block diagram of a configuration of a display section.

FIG. 14 is a functional block diagram of the normalized power consumption calculation/display section 205.

As shown in FIG. 14, the display portion 1106 includes a graphing portion 1401 and an output portion 1402.

The display portion 1106 receives normalized power consumption calculated in the normalized power consumption-calculating portion 1105, and normalized reference power consumption data received by the normalized reference power consumption data-receiving portion 1102, as in the display portion 1106 shown in FIG. 11.

The graphing portion 1401 graphs normalized power consumption of each device 201 and produces a display image facilitating the comparison between normalized reference power consumption data and normalized power consumption data.

Figure 15:
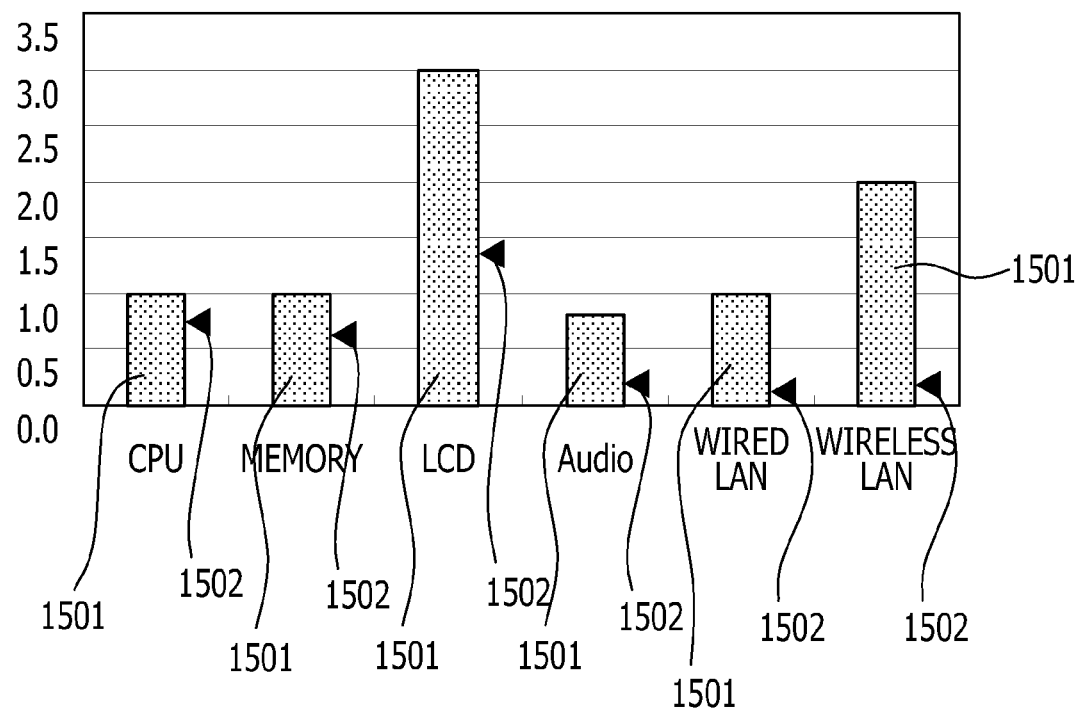
FIG. 15 is a representation of an indication of graphed normalized powers and normalized reference powers.

FIG. 15 shows normalized power consumption data and normalized reference power consumption data, graphed by the graphing portion 1401.

For example, the normalized power consumptions of devices including a CPU, a memory device, an LCD, an audio device, a wired LAN device and a wireless LAN device are indicated by bars 1501 in a bar graph, as shown in FIG. 15.

The normalized reference power consumptions of the devices are indicated by triangular indicators 1502 adjacent to the respective bars 1501.

The output portion 1402 outputs a graph image of the normalized power consumptions and normalized reference power consumptions produced by the graphing portion 1401 to a display device, such as a liquid crystal display.

Thus, the current power consumption level can be determined from the graphed normalized power consumption data and normalized reference power consumption data. Such a graph image can help the user reduce power consumption.

Figure 16:
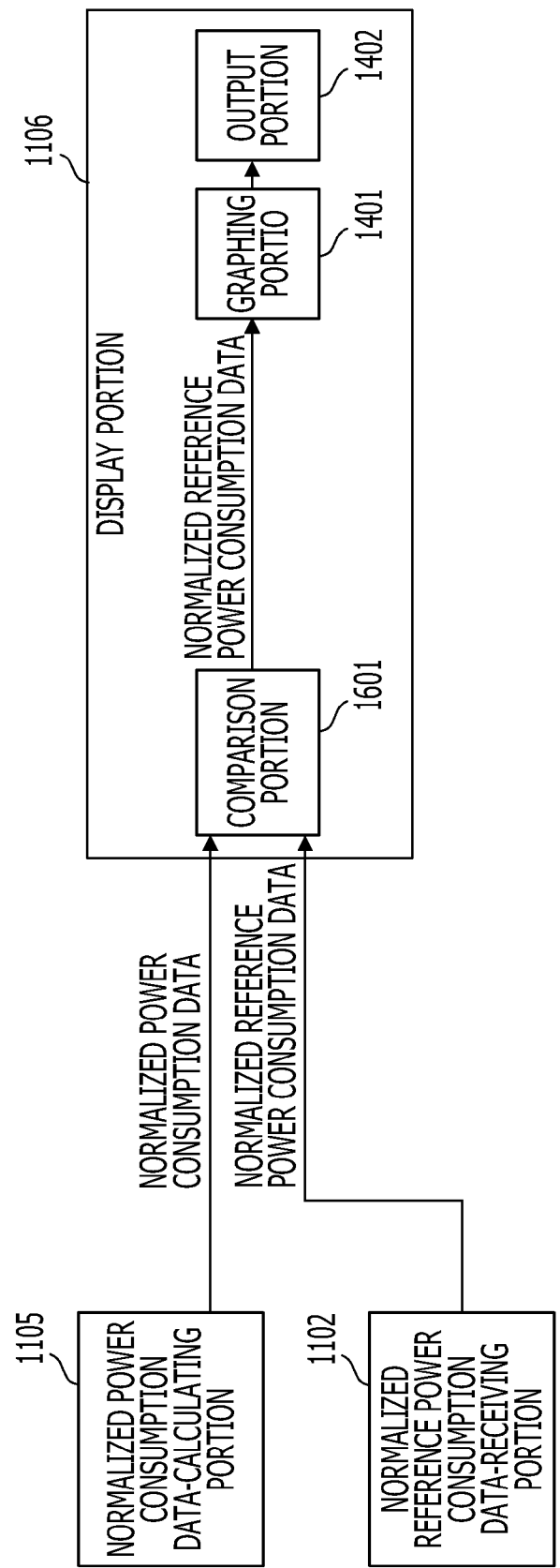
FIG. 16 is a functional block diagram of another configuration of a display section.

FIG. 16 is a functional block diagram of another configuration of a display section 1106.

The display portion 1106 shown in FIG. 16 is different from that shown in FIG. 14 in that the display portion 1106 includes a comparison portion 1601 comparing normalized power consumption data and normalized reference power consumption data.

In contrast, they are the same in that the normalized power consumption calculated by the normalized power consumption data-calculating portion 1105 and the normalized reference power consumption received by the normalized reference power consumption data-receiving portion 1102 are input to the display portion 1106.

The comparison portion 1601 compares normalized power consumption data calculated by the normalized power consumption-calculating portion 1105 and normalized reference power consumption data received by the normalized reference power consumption data-receiving portion 1102. If there is a device exhibiting a normalized power consumption higher than the normalized reference power consumption, the normalized power consumption data of the device is transmitted to the graphing portion 1401.

The graphing portion 1401 expresses the normalized power consumption data received from the comparison portion 1601 in a bar graph as shown in FIG. 15, and outputs the graph to a liquid crystal display or the like through the output portion 1402.

The graphing portion 1401 may be configured such that normalized reference power consumption data corresponding to the graphed normalized power consumption data can simultaneously be indicated.

The graphed portion 1401 may produce other graphs, such as circle graphs and line graphs, to facilitate visible observation of the data.

Thus, the system according to an embodiment of the present invention calculates an average power consumption of information processing apparatuses under control of a power management server, and shows normalized power consumption data to the user. The normalized power consumption data can be compared with reference power consumption data at a time of executing a reference application program is executed, so that the user can determine a current power consumption level.

In addition, the use of normalized power consumption data can cancel the variations in power consumption among information processing apparatuses and can accurately show the level of power consumption of the information processing apparatuses with respect to a target power consumption.

Furthermore, the user can always check the current power consumption of the information processing apparatuses and also easily know the effect of power saving. This can promote the use of information processing apparatuses under power saving conditions. Since the variation in power consumption among information processing apparatuses can be cancelled, the power consumptions can be known accurately and equal power saving conditions can be applied to the apparatuses.

Accordingly, an embodiment of the present invention adjusts conditions considered for managing power consumption based on a calculation of normalized power using conditions applicable to current information of an operation. An embodiment includes a computer-implemented power management method, including obtaining operational conditions applicable to power consumption of a program, calculating a normalized power consumption using the operational conditions obtained and adjusting data of the power consumption using the calculated normalized power consumptions for the power management during an operation of the program.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. Further, according to an aspect of the embodiments, any combinations of the described features, functions and/or operations can be provided.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention, the scope of which is defined in the claims and their equivalents.

What is claimed is:

1. An information processing apparatus capable of communicating with a power management server, the information processing apparatus comprising:
    devices operating therein;
    a processor executing an operation including:
        measuring power consumptions of the devices and outputting power consumption data;
        receiving, from the power management server, application-setting conditions designating operational conditions of the devices for measuring the power consumptions of the devices, setting the operational conditions of the devices according to the application-setting conditions, and executing an application program to measure reference power consumptions of the devices for executing the application program;
        transmitting the power consumption data outputted to the power management server, the power consumption data including the reference power consumptions;
        receiving, from the power management server, normalized reference power consumption calculated from reference power consumptions of a plurality of information processing apparatuses connected with the power management server, and calculating a normalized power consumption from the normalized reference power consumption and the reference power consumptions using variation of characteristics of the information processing apparatuses; and
        indicating the normalized power consumption and identifying conditions among the operational conditions set that are needed to maintain a target power consumption across the variation of characteristics of the plurality of information processing apparatuses.

2. The information processing apparatus according to claim 1, wherein the normalized reference power consumption is an average of the reference power consumptions of the plurality of information processing apparatuses.

3. The information processing apparatus according to claim 1, comprising:

setting the power consumptions of the devices so that the normalized power consumption satisfies a predetermined power setting requirement.

4. A power management server connected with a plurality of information processing apparatuses including devices through a network, the power management server comprising:
 a processor executing an operation including:
  transmitting application-setting conditions to be given to the devices of each information processing apparatus when the information processing apparatus executes an application program to measure reference power consumption of the information processing apparatus;
  receiving, from the information processing apparatus, the reference power consumption measured when the application program is executed with the devices under a given application-setting conditions;
  calculating normalized reference power consumption from the reference power consumptions of the plurality of information processing apparatuses using variation of characteristics of the information processing apparatuses; and
  transmitting the normalized reference power consumption to the information processing apparatuses and identifying conditions among the operational conditions set that are needed to maintain a target power consumption across the variation of characteristics of the plurality of information processing apparatuses.

5. The power management server according to claim 4, wherein the normalized reference power consumption is an average of the reference power consumptions of the plurality of information processing apparatuses.

6. The power management server according to claim 4, comprising:
 determining a power setting requirement for operating the information processing apparatuses and transmitting the power setting requirement to the information processing apparatuses.

7. A method for power management, the method comprising:
 measuring power consumptions of devices and outputting power consumption data;
 receiving application-setting conditions designating operational conditions of the devices for measuring the power consumptions of the devices,
 setting the operational conditions of the devices according to the received conditions, and executing an application program to measure reference power consumptions of the devices for executing the application program;
 transmitting power consumption data to a power management server;
 receiving, from the power management server, normalized reference power consumption calculated from the reference power consumptions of a plurality of information processing apparatuses, and calculating a normalized power consumption from the normalized reference power consumption and the reference power consumptions using variation of characteristics of the information processing apparatuses; and
 indicating the normalized power consumption and identifying conditions among the operational conditions set that are needed to maintain a target power consumption across the variation of characteristics of the plurality of information processing apparatuses.

8. A computer-implemented power management method, comprising:
 measuring reference power consumption using operational conditions designated for a program;
 calculating a normalized power consumption from normalized reference power consumptions of a plurality of apparatuses and the reference power consumption measured; and
 transmitting the normalized power consumption to the plurality of apparatuses and identifying at least one of the operational conditions that is needed to maintain a target power consumption across variation of characteristics of the plurality of apparatuses.

* * * * *